May 18, 1965 B. V. DORE ETAL 3,184,636
COLD CATHODE
Filed June 15, 1961 3 Sheets-Sheet 1

INVENTORS
BURNELL V. DORE
RICHARD A. HEIN
BY John F. Lawler
ATTORNEY

May 18, 1965  B. V. DORE ETAL  3,184,636
COLD CATHODE
Filed June 15, 1961  3 Sheets-Sheet 2
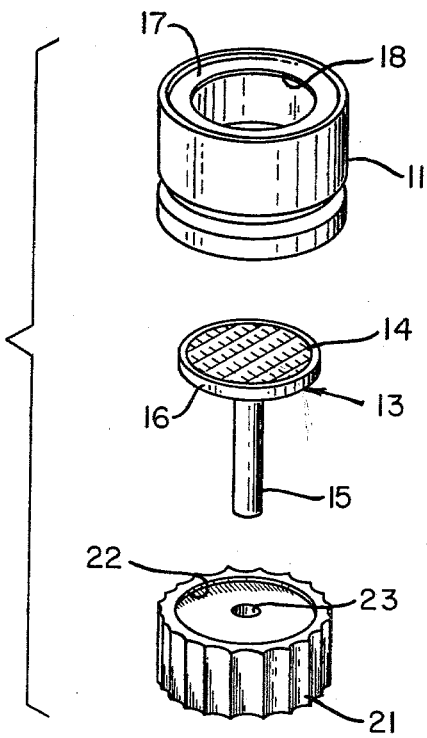
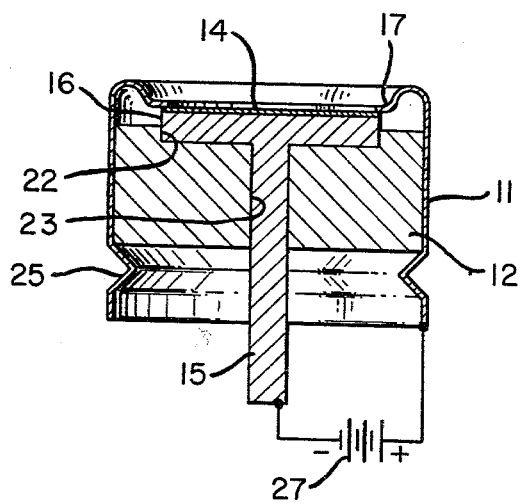
INVENTORS
BURNELL V. DORE
RICHARD A. HEIN
BY *John F. Lawler*
ATTORNEY

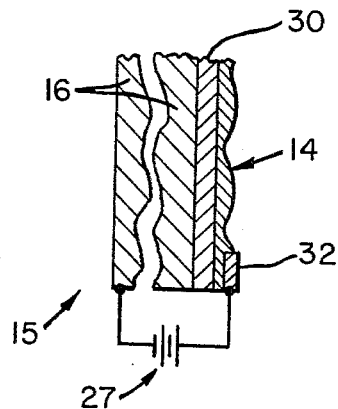
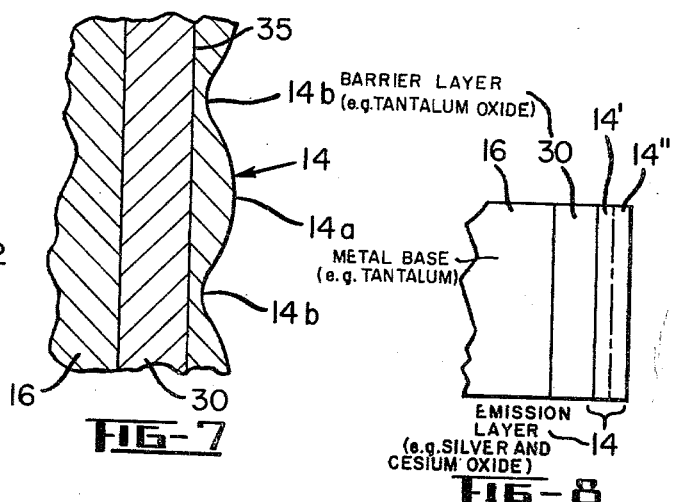
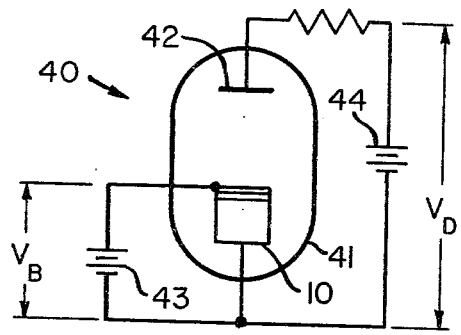
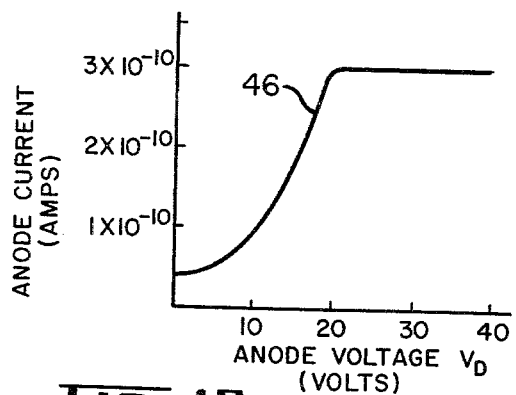
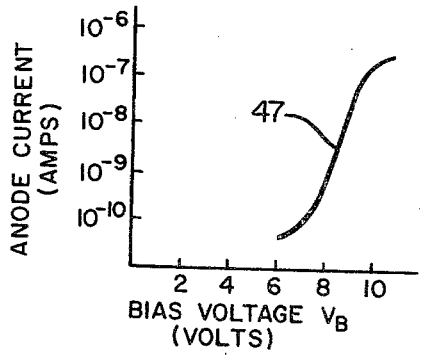
INVENTORS
BURNELL V. DORE
RICHARD A. HEIN

United States Patent Office

3,184,636
Patented May 18, 1965

3,184,636
COLD CATHODE
Burnell V. Dore, Sunnyvale, and Richard A. Hein, Palo Alto, Calif., assignors to Sylvania Electric Products Inc., a corporation of Delaware
Filed June 15, 1961, Ser. No. 117,236
8 Claims. (Cl. 315—94)

This invention relates to electron emission devices and more particularly to electron emission devices that operate without application of heat.

The search for an electron emission structure which produces significant electron emission without the use of heat has been a long one. Not only are heated cathodes inefficient from an electron emission standpoint, but the side effects of the heat have created many design problems, not the least of which is removal of heat from the emission area. In addition, the attainable beam power (electron density) from such cathodes is often limited by the heat factor.

This invention is directed to a cathode which depends upon an internal electric field to cause emission of electrons. This cathode operates on the electron tunneling principle which is described in some detail in the application of Donovan V. Geppert entitled Cold Cathode, Serial No. 58,841, filed September 27, 1960, and assigned to the assignee of this application. Briefly, the cathode structure comprises a layer of semiconductor material sandwiched between two metallic layers, and a unidirectional bias voltage applied across the two metal layers. The internal field produced by this bias voltage causes electrons to tunnel from one metallic layer through the semiconductor material, called "barrier" layer, and through the second metal layer for emission therefrom.

The present invention is specifically concerned with an improved cold cathode construction and the method of making it. In accordance with the invention, the emission layer of the cathode structure includes a metal, such as silver or gold, and a photosensitive semiconductor material which has a relatively low work function and a low electron affinity. The work function is defined as the energy (electron-volts) needed to remove an electron from the Fermi level in a metal to a point an infinite distance away from the surface. By "relatively low work function" is meant two electron volts or less. This semiconductor emission layer, while substantially less conductive than a metal, should be sufficiently conductive to impress a bias voltage across the cathode structure. The oxides of alkali metals and of alkali earth metals are suitable for such semiconductor emission layers and may comprise barium oxide, cesium antimonide, and cesium oxide.

A general object of this invention is the provision of an electron emission device which operates without the use of heat.

A further object is the provision of a method of making a cold cathode which permits the formation of an extremely thin emission layer required for efficient operation.

Other objects will become apparent from the following description of a preferred embodiment and method of making the invention, reference being had to the accompanying drawings in which:

FIGURE 4 is an exploded view of the cathode assembly shown in FIGURE 3;

FIGURE 5 is an enlarged longitudinal section of the cathode taken along the plane 5—5 of FIGURE 3;

FIGURE 6 is a sectional view (not to scale) of the active cathode layers;

FIGURE 7 is a portion (greatly magnified) of FIGURE 6 at the interface of the semiconductor and emission layers;

FIGURE 8 is a schematic view of the active layers comprising the cathode showing the construction of the emission layer;

FIGURE 9 is a schematic representation of the cathode, greatly enlarged, used in a diode; and FIGURE 10 and 11 are performance curves for the diode of FIGURE 9 showing the plot of anode current against anode and bias voltages.

For a better understanding of the invention, the underlying electron tunneling principle is now briefly reviewed.

Assume that an electron is moving in a potential field and encounters an elevated potential in its pathway. According to classical mechanics, the electron is always reflected. However, classical mechanics does not take into account the wave nature of electrons. According to quantum-mechanics, an electron approaching a potential barrier has a finite probability of "tunneling" through the barrier and appearing on the other side. In electron tunneling, out of 1,000 electrons approaching the barrier, 999 may be reflected and only one electron transmitted through it. However, if the number of electrons which approach the barrier per second is large, the tunneling current can be quite high. Field emission is an example of tunneling, and current densities of thousands of amperes per square centimeter have been measured.

Tunneling current is related to the gradient of the electric field and the height of the barrier. The smaller the barrier height, the greater the tunneling current for a given field. For an intrinsic semiconductor contacting a metal, the barrier height is roughly one-half the width of the forbidden gap.

Figure 1:
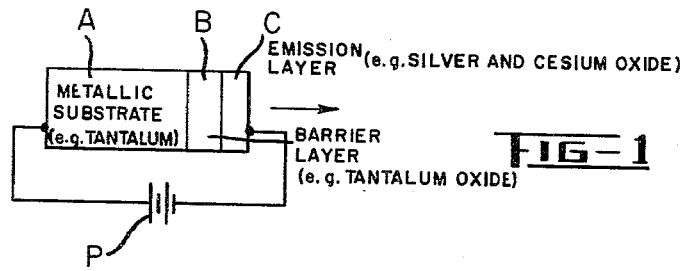
FIGURE 1 is a schematic view of an electron emitter structure which operates on the electron tunneling principle.

Electrons tunneling from a metal substrate A, see FIGURE 1, through a thin semiconductor B, to a thin metal layer C when a bias potential from a source P is applied across A and C, can be utilized to produce electron emission from layer C in the direction of the arrow into a vacuum.

Figure 2:
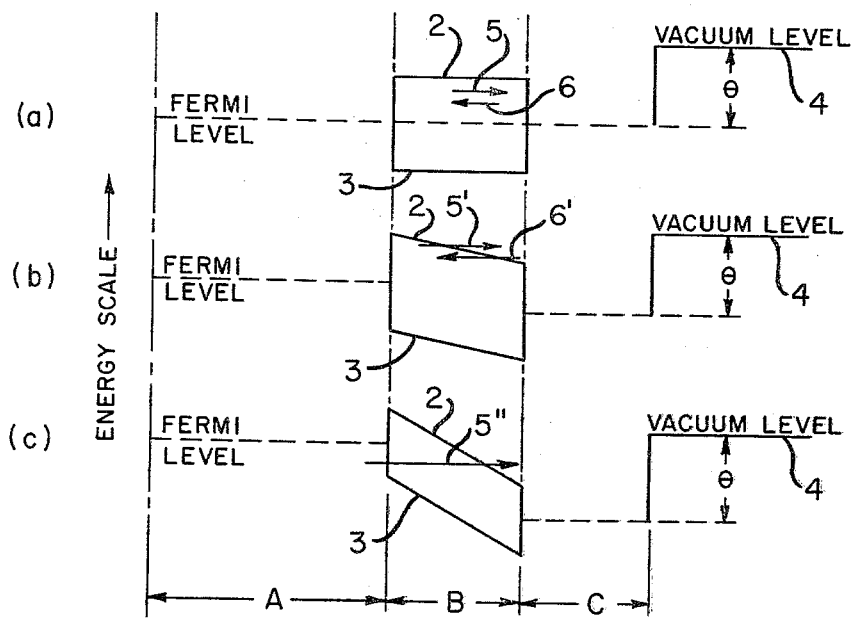
FIGURE 2 is a simplified energy band diagram illustrating the electron tunneling principle of the emitter.

The emission process will be better understood by reference to FIGURE 2. In this figure, the energy of the electron is plotted as increasing in an upward direction, thus making positive potential downwards, as shown. The horizontal broken lines in each of FIGURES 2a, 2b, and 2c represent the Fermi energy level in the respective parts A and C of the cathode structure. The upper and lower limits 2 and 3, respectively, of each of the rectangles in FIGURES 2a, 2b and 2c represent the bottom of the conduction band and the top of the valence band, respectively, in the semi-conductor layer B. The symbol $\phi$ represents the work function of the material in layer C, and the vacuum level is designated at 4.

As shown in FIGURE 2a, with no bias voltage applied, the electrons tunnel through the semiconductor B in both directions in equal amounts as indicated by the arrows 5 and 6, giving zero net external current flow. The vacuum level 4 represents the energy of an electron at rest in the vacuum and is $\phi$ volts higher than the Fermi level in metal layer C. The Fermi level is the highest energy level an electron can possess at absolute zero temperature. Notice that the Fermi level is continuous through all three materials with no bias voltage applied.

FIGURE 2b represents the situation where moderate bias voltage is applied but not enough for emission. The highest energy electrons, which at low temperature are essentially at the Fermi level, are still at a lower energy level than the vacuum level. Electrons may tunnel in both directions through portion B, as before, but no longer in equal amounts, as indicated by the arrows 5', 6'. More electrons tunnel from part A to part C than from part C to part A because electrons at the Fermi level in part A face more empty states in part C than vice versa. Therefore, a bias current flows through the bias voltage supply. The lengths of the arrows 5', 6' signify this difference in tunneling with applied bias. Note that the assumption is made in FIGURE 2 that the metals in portions A and C have such high conductivity that essentially all the voltage drop occurs across the layer B. Also note that when bias voltage is applied, the Fermi levels in metals A and C are at different energies.

Finally, in FIGURE 2c, the status of emission bias is reached wherein the vacuum level is at the same energy as the Fermi level in metal A. The tunneling from metal C to metal A has practically ceased and all the tunneling is from part A to part C as indicated by the arrow 5''. The possible energy levels in layer C (above the Fermi level) become filled with electrons that have tunneled from layer A, and a large bias current flows. When the bias voltage is increased slightly, some electrons are injected into the vacuum with an initial kinetic energy (not thermally derived) and the entire cathode and bias supply begins to acquire a positive charge. This charge builds up until as many electrons are pulled back to the cathode from the vacuum as are injected into the vacuum from the cathode.

Figure 3:
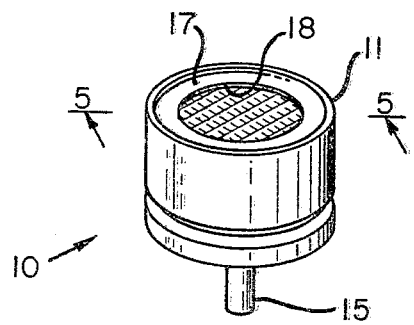
FIGURE 3 is an isometric view of a cathode assembly embodying this invention.

Referring now to FIGURES 3, 4 and 5, a preferred embodiment of the invention is a cathode assembly 10 comprising a cathode holder 11, preferably made of metal and forming a housing for the other parts of the assembly. Telescoped within holder 11 is a disc-like cathode button 13 having a gridded emitting surface 14 and a base or substrate portion 16 to which an oppositely extending bias terminal 15 is connected.

Button 13 is located within holder 11 so that the marginal edge of emitting surface 14 abuts re-entrant or depressed end lip 17 of the holder. The circular inner edge 18 of lip 17 defines the boundary of the effective emission area of surface 14. Lip 17 makes firm positive electrical contact with emitting surface 14 to provide bias for the cathode as will be explained below.

The holder assembly includes a ceramic retainer 21 which fits over the back of the cathode button so that substrate 16 seats in retainer recess 22 with terminal 15 extending snugly through retainer opening 23. The retainer serves to insulate substrate 19 and terminal 15 from the rest of the assembly and additionally mechanically supports these parts in proper position within the holder 11. The emitting surface 14 is held against contact lip 17 under slight pressure by a crimp 25 in the holder skirt. The peripheral edge of the ceramic spacer is scalloped to avoid gas-trapping during evacuation of the gun structure in which the cathode assembly is mounted.

A source of bias potential for the cathode is indicated as a battery 27 (see FIGURE 5), the negative side of which is connected to the terminal 15 and the positive side of which is connected to surface 14 through holder 11 and lip 17.

Referring now to FIGURE 6, the structure of cathode button 15, shown schematically, comprises essentially a three-layer unit consisting of substrate 16, a barrier layer 30 of semiconductor material, and the emission layer 14. A contact platform 32 formed on the marginal edge of surface 14 provides a flat electrical contact against which holder contact lip 17 bears.

In one form of the invention, substrate 16 comprises pure tantalum metal and barrier layer 30 consists of a very thin film-like layer of tantalum oxide ($Ta_2O_5$) formed by anodizing the surface of the substrate. Emission layer 14 consists of a thin composite film such as silver and cesium oxide, having a relatively low work function. Layer 30 may be in the order of 150 Angstrom units thick, and layer 14 in the order of 200 Angstrom units thick.

The process of forming these layers is described in detail below.

Important surface conditions affecting electron emission from the cathode into a vacuum are the absolute thickness of the emission layer, irregularities in the surface 34 of substrate 16 (that is, pits and projections), and the electrical conductivity of layer 14 for applying bias potential over maximum area of the barrier layer 30. The theoretical optimum thickness of emission layer 14 can be calculated but in practice it is difficult to achieve due to the irregularities in barrier surface 35 resulting from unavoidable irregularities in substrate surface 34. Furthermore, the optimum thickness of metal in layer 14 conducive to efficient tunneling of electrons is less than the proper thickness for good electrical conductivity necessary to apply the bias potential over the area of the barrier layer 30.

In order to effectively balance these limitatioins on surface conditions, emission layer is formed with an undulating configuration shown in FIGURES 6 and 7. The thickness of this layer varies from a few Angstroms at the minima points or "valleys" 14b to 500 Angstroms or more at the maxima points or "peaks" 14a, and this surface shape is a repetitive pattern over the entire emission area.

The metal which comprises part of layer 14 is deposited on the semiconductor layer 30 through a parallel wire grid so that the rate of deposition of the metal is greater under the spaces between the wires than under the wires. The result is that layer 14 has a sinusoidal-like configuration shown in the drawings. The thicker portions 14a function somewhat as bus bars in distributing the bias voltage to all parts of the layer, and the shallower parts 14b and adjacent portions are more nearly of the proper thickness which is conducive to tunneling. While there is emission from less than the total surface area of layer 14, substantial emission is attainable from this compromise and reproducibility of the cathodes is greatly improved.

Emission layer 14 preferably comprises a sublayer 14' (see FIGURE 8) of silver, or similar metal having a low work function, at interface 35, and sublayer 14'' comprising a photosensitive material such as cesium oxide ($Cs_2O$). Although emission can be obtained with a metal film alone, we have discovered that emission chraracteristics are improved considerably by forming this composite layer. We believe that these results are obtained because of the relatively low work function (0.85 electron volts or less) of the photosensitive material. Electrons tunneling across semiconductor layer 30 enter the conduction band of metal layer 14 and begin to lose their energy through collision with the lattice structure of the metal and with other electrons. It is postulated that the photosensitive material has a lattice structure which is open to a greater degree than that of silver and so tunneling electrons pass through it more readily than through silver alone. Thus the electrons in passing through this composite layer, encounter fewer obstacles that might impede their movement and they are emitted from the layer 14 in greater numbers resulting in higher beam densities.

While we have described a preferred embodiment of the invention comprising substrate 19 of tantalum (Ta), semiconductor 30 of tantalum oxide ($Ta_2O_5$) and emission layer 14 comprising sublayers 14' of silver (Ag) and 14'' of cesium oxide ($Cs_2O$), it will be understood that other materials may be employed successfully to practice the invention. For example, the substrate 19 may consist of aluminum, copper, nickel, iron or titanium and semiconductor layer 30 may for convenience, consist of the respective oxides of those metals, or layer 30 may be the oxides of dissimilar metal. Layer 14 preferably is made of material having a low work function and low electron affinity, and thus may comprise antimony (Sb) and cesium antimonide (CsSb), or the combination with silver of barium oxide (BaO), lithium (Li) or rubidium (Rb).

A preferred method of making an electron emission device embodying this invention will now be described.

To prepare the substrate layer 16 of the cathode structure, a disk of sheet tantalum metal, approximately one-eighth of an inch in diameter and 0.010 inch thick is electropolished in a bath of the following composition measured in millititers of solute per liter of solution:

| | Ml./l. |
|---|---|
| Sulfuric acid (specific gravity=1.84) | 850 |
| Hydroflouric acid (48 percent) | 85 |
| Water (deionized) | 65 |

A carbon cathode is used with a current density of 200 amperes per square foot. The part is made anodic and electropolished for 12–15 minutes to attain the desired finish. This provides the basic substrate layer 16 of the cathode structure. This specimen is then anodized in a 5.0 percent solution of ammonium borate adjusted to a pH factor of 8 at twenty volts direct current for a period of 17 hours to form a semiconductor layer 30 of tantalum oxide ($Ta_2O_5$) which is approximately 400 Angstroms thick. This semiconductor layer 30 is thus firmly bonded to the metal substrate 16.

Next, a thin film of silver is deposited on the semiconductor layer 30 to begin formation of emission layer 14. The wave-like configuration of this layer as shown in FIGURES 6 and 7 is formed initially by placing a parallel wire tungsten grid directly over and approximately 0.250 inch from the semiconductor layer, so that the grid essentially covers that end of the cathode. The grid has parallel wires 0.010 inch in diameter and interwire spacing of 0.010 inch.

The grid-covered specimen is then exposed in an atmosphere of vaporized silver in a suitable evaporator so that silver is deposited on the semiconductor surface 30 through the grid to form valleys 14b (see FIGURES 6 and 7) directly beneath each wire of the grid and peaks 14a under the spaces between the wires. Deposition of the silver continues until the peaks 14a merge into each other and a silver layer completely covers the surface 35 of the semiconductor. Control of the height of the "peaks" and depth of the "valleys" of the grid pattern is afforded by varying the spacing of the screen from the specimen and by changing the rate of deposition of silver for a given time.

Determination of the proper thickness of silver to be deposited on semiconductor layer 30 preferably is accomplished by concurrently optically measuring the thickness of silver deposited on a monitor plate located adjacent to the cathode specimen. Pure silver is heated in a molybdenum or tantalum boat at reduced pressures to cause vaporization of the silver and deposit thereof simultaneously on the sample and monitor plate supported above the boat. The optical measuring system comprises a photometric device similar to that described in U.S. Patent No. 2,716,662, in which high intensity light is collimated, passes through the silver film, and impinges on a photosensitive detector to produce an output current which may be measured by a meter calibrated in Angstrom units of film thickness. This provides control of the average thickness of the film, the absolute value of which varies due to the undulating configuration of the surface as shown in FIGURE 8.

A contact strip 32 of silver is next deposited by evaporation on the perimeter of the emission layer to provide a contact platform against which lip 17 of cathode holder 11 presses for applying a biasing voltage across emission layer 14.

The exposed silver in layer 14 is next partially oxidized so that the outer surface is transformed into silver oxide (AgO). The oxidation process consists of embedding the sample piece in the body of a negative electrode so that silver surface of the sample is flush with the active surface of the electrode. An arc discharge is then caused between an adjacent positive electrode and this negative electrode is an oxygen atmosphere. Positive oxygen ions bombard the negative electrode including the exposed surface 14 of the sample and thereby oxidize it. This process has been successfully practiced with a voltage differential of 1,000 volts between the electrodes and in oxygen at a pressure of 20–30 microns of mercury for a period of approximately two minutes.

The next step in preparing the cathode sample is to expose the silver oxide on layer 14 to cesium metal vapor so that the cesium may combine with the silver oxide to form cesium oxide and free silver in accordance with the following formula:

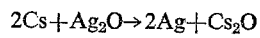

$$2Cs + Ag_2O \rightarrow 2Ag + Cs_2O$$

This step is accomplished by placing the sample cathode in a vacuum tight envelope with an anode electrode opposite the emitting surface 14 so as to constitute a diode. A source of cesium is located in an appendage to this envelope and is vaporized by heat so cesium vapor permeates the envelope and ultimately deposits on the emission layer 14. With the pressure in the envelope reduced to approximately $10^{-6}$ mm. Hg, a bias voltage is applied across the emission layer 14 and substrate 19, and a positive voltage is applied to the nearby anode electrode. Current flowing in the external circuit connected to the anode and the substrate 19 of the cathode is a direct measure of electron emission from layer 14 of the cathode. While this current is monitored, the cesium vapor deposits uniformly on the layer 14 until the current flow is maximum. This indicates the proper amount of cesium has reacted with the silver oxide in the emission layer. If more than the optimum quantity of cesium reacts with the silver oxide, this current decreases.

It is important in the processing of the cathode that cesium be liberated rather slowly into the vacuum envelope so that the density of cesium vapor does not become excessive. By way of example, a successful cathode was produced with cesium reacting with the silver oxide under a pressure of $10^{-6}$ mm. Hg and a temperature of 30 to 35 degrees centigrade for a period of 75 hours.

As a result of exposure of the sample cathode to the cesium vapor, the cesium reacts with the silver oxide to form a layer of cesium oxide and free silver. This is shown schematically in FIGURE 8 wherein layer 14' represents the free silver and 14'' the cesium oxide in the emission layer 14. The work function of the cesium oxide is approximately 0.85 electron volt which satisfies the condition that the emission layer have a relatively low work function to provide for emission of electrons into a vacuum. Being a typical photosensitive material, it also has a low electron affinity.

A sample cathode made in accordance with the process outlined above was tested in a diode 40 (see FIGURE 9) comprising an envelope 41, an anode 42, cathode 10, a source 43 of bias voltage $V_B$, and a source 44 of anode voltage $V_D$. Performance curves for diode 40 are shown in FIGURES 10 and 11. Curve 46 in FIGURE 10 resulted when anode voltage $V_D$ was varied and bias voltage $V_B$ was held constant at 10 volts A.C. Curve 47 in FIGURE 11 shows the variation of anode current with bias voltage under conditions of a constant anode voltage of 75 volts and a pressure within envelope 41 of $8 \times 10^{-7}$ mm. Hg. Curve 47 indicates that a bias of approximately 6.2 volts is required for emission, and peak emission density was estimated to be in the order of $10^{-6}$ to $10^{-5}$ amperes per square centimeter.

Changes, modifications and improvements to the above described preferred embodiment and preferred methods of making this invention may be practiced by those skilled in the art without departing from the spirit and scope of the invention. The appended claims define the features of novelty of this invention.

We claim:

1. An electron emission device comprising a metallic substrate, a barrier layer of semiconductor material formed on said substrate, an emission layer formed on said barrier layer, said emission layer comprising a combination of a conductor having a relatively low work function and an oxide of an alkali earth metal, a source of bias voltage, and means for connecting said source to said substrate and to said conductor for applying an electric field across the barrier layer.

2. The device according to claim 1 in which said barrier layer comprises an oxide of said metal substrate.

3. The device according to claim 2 in which said alkali metal oxide is photosensitive.

4. An electron emission device comprising a metal substrate, a layer of semiconductor material intimately bonded to a surface of said substrate, the thickness of said semiconductor layer being less than 400 Angstrom units, a metallic film formed on said semiconductor layer, the thickness of said film varying from a minimum less than 100 Angstrom units to a maximum greater than 500 Angstrom units, a layer of photosensitive material intimately bonded to said metal film, and means for applying a unidirectional bias voltage across said semiconductor layer.

5. The device according to claim 4 in which the thickness of said metal film alternates between said maximum and minimum values in one direction across the film.

6. An electron emission device comprising a metallic base having a smooth surface, a layer of semiconductor material on said surface, said semiconductor material comprising the oxide of the metal in said base and being formed to a thickness less than 400 Angstrom units, a composite layer on said semiconductor layer comprising a first metallic layer in contact with said semiconductor layer and a second layer of photosensitive material on said first layer, the thickness of said composite layer varying uniformly over the surface area from a maximum of approximately 500 Angstrom units to a minimum less than 100 Angstrom units, a source of bias voltage, and means for electrically connecting said source to said base and to said first metallic layer whereby an electric field is impressed across said semiconductor layer.

7. An electron emission device comprising a base of tantalum having a smooth surface, a layer of tantalum oxide on said surface, a film of metal having a relatively low work function on said oxide layer, a surface layer comprising an oxide of an alkali metal intimately bonded to said metal film, and means for applying a voltage to said metal film and to said base whereby an electric field is produced in said tantalum oxide layer and electrons tunnel from the base to the metal film and result in electron emission from the surface oxide layer.

8. An electron emission device comprising a base of tantalum having a smooth surface, a layer of tantalum oxide on said surface, a film of silver on said oxide layer, a layer of cesium oxide intimately bonded to said silver film, and means for applying a voltage to said silver film and to said base whereby an electric field is produced in said oxide layer and electrons tunnel from the base through the oxide layer to the silver film and result in electron emission from the cesium oxide layer.

References Cited by the Examiner

UNITED STATES PATENTS

| | | | |
|---|---|---|---|
| 2,677,873 | 5/54 | Buck | 29—25.17 |
| 2,753,615 | 7/56 | Claude et al. | 29—25.17 |
| 2,945,151 | 7/60 | Firth | 313—346 |
| 2,960,659 | 11/60 | Burton | 313—346 |
| 3,016,472 | 1/62 | Coppola | 313—346 |
| 3,056,073 | 9/62 | Mead. | |
| 3,105,166 | 9/63 | Choyke et al. | 313—346 X |
| 3,119,947 | 1/64 | Goetzberger | 313—346 |

GEORGE N. WESTBY, *Primary Examiner.*

RALPH G. NILSEN, *Examiner.*